United States Patent [19]

Ohmi

[11] 4,271,670
[45] Jun. 9, 1981

[54] POWER ASSIST MECHANISM
[75] Inventor: Atsushi Ohmi, Anjoshi, Japan
[73] Assignee: Aisin Seiki Kabushiki Kaisha, Kariya, Japan
[21] Appl. No.: 63,263
[22] Filed: Aug. 2, 1979
[51] Int. Cl.³ .............................................. B60T 13/20
[52] U.S. Cl. .................................... 60/554; 91/369 A
[58] Field of Search ............ 91/369 A, 369 R, 369 B; 60/547 R, 554, 552, 553

[56] References Cited
U.S. PATENT DOCUMENTS

| | | | |
|---|---|---|---|
| 3,096,689 | 7/1963 | Kytta | 91/369 A |
| 3,548,595 | 12/1970 | Peck | 91/369 A |
| 3,937,021 | 2/1976 | Sisco | 91/369 A |
| 4,072,014 | 2/1978 | Gardner | 91/369 A |

Primary Examiner—Abraham Hershkovitz
Attorney, Agent, or Firm—Oblon, Fisher, Spivak, McClelland & Maier

[57] ABSTRACT

A brake booster mechanism comprising a casing, one or more pressure responsive power walls in the casing, valve mechanism associated with the power wall and being movable relative thereto to control the differential pressure across the power wall, an actuating member connecting the pedal for manually moving the valve mechanism, an output member for connecting the power wall to a brake master piston, a brake feel reaction member having a compressive member interposed between the actuating member and the output member with a play clearance with respect to the actuating member in the retracted position of the booster mechanism, and adjusting thread member for regulating the play clearance whereby during initial stage movement of the actuating member is opposed by no brake reaction force through the compressive member until the actuating member becomes in abutment against the compressive member past the clearance.

4 Claims, 1 Drawing Figure

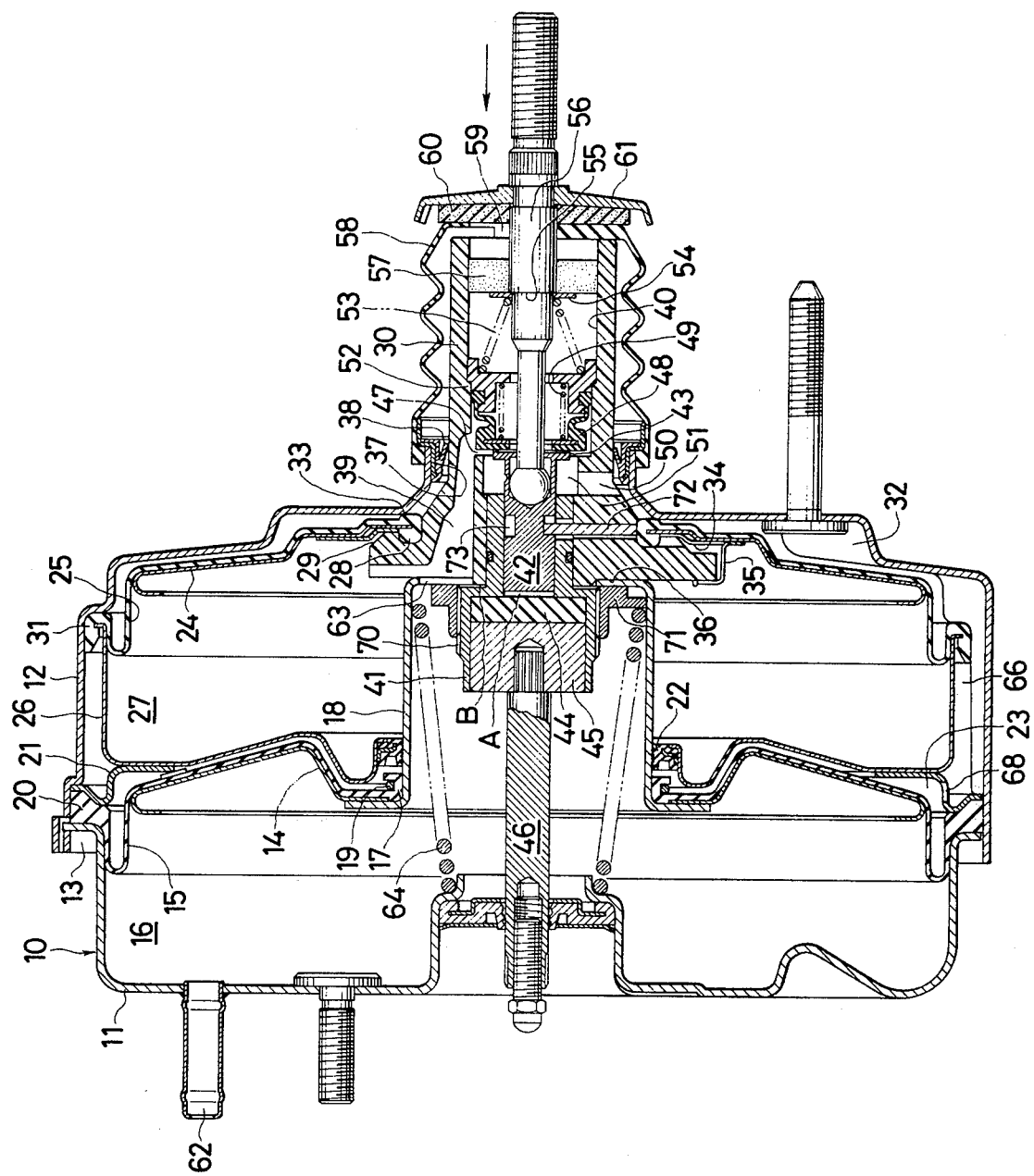

POWER ASSIST MECHANISM

BACKGROUND OF THE INVENTION

This invention relates to brake booster mechanism and particularly to power assist mechanism for aiding in the manual application of brakes on a vehicle.

It has been proposed in the art to use initial brake pedal movement to actuate a valve control mechanism producing powered force which is transmitted to the braking system before any manual effort is applied to the brakes with an aim to attain to a necessary minimum braking distance of an automotive vehicle.

Several types of power assist mechanism have been developed. These power assist mechanisms have been generally successful and highly efficient in operation, but they usually are of such type that attains the foregoing object by provision of an initial stage of the pedal movement in which the control mechanism is solely actuated without being opposed by any brake reaction force. Difficulties exist, since the first stage is substantially a very short period of time and the corresponding stroke of the pedal and hence an actuating member is also short, so that any manufacturing tolerance tends to cause undesirable non-uniformity of operation of the power assist mechanism. This is considered a drawback particularly for saving substantial manufacturing cost in that, all the components are required to be corrected independently of each other for eliminating their tolerance.

It is a principal object of the present invention to provide an improved power assist mechanism having a simple means for adjusting the initial stage stroke of the pedal and hence the valve control mechanism actuating member so that any manufacturing tolerance of the actuating member can be overcome when the power assist mechanism is installed by adjusting the adjusting means.

SUMMARY OF THE INVENTION

The foregoing object and others are attained according to at least one aspect by the provision of thread means for regulating the length of the initial stage stroke of the actuating member of the control valve mechanism.

Therefore, the invention includes a casing, at least one power wall disposed within the casing and dividing the interior of the casing into chambers on the opposite sides of the power wall, control valve mechanism formed of first control valve means for controlling fluid communication between the chambers and second control valve means for controlling communication between one of the chambers and a fluid pressure source, actuating means connected to a manually operable pedal for actuating the control valve mechanism, output means for connecting the power wall to a brake master piston, brake feel reaction means interposed between the actuating means and the output means with a play clearance with respect to the actuating means, and thread means for regulating the length of the clearance.

BRIEF DESCRIPTION OF THE DRAWING

FIGURE is a transverse cross-sectional view of a power assist mechanism or brake booster incorporating features of this invention.

DESCRIPTION OF THE PREFERRED EMBODIMENTS

In this invention a brake booster or power assist mechanism consists of a casing 10 comprised of the casing part 11 and the casing part 12 secured together by a known buyonet lock arrangement 13. A movable power wall 14 is disposed within the casing and cooperates with a rolling diaphragm 15 to form the first chamber 16 at the left side of the power wall in the view. The rolling diaphragm 15 has its inner annular periphery 17 secured by being tightened with a ring 19 to a cylindrical member 18 also sealingly secured to the power wall 14 through means of welding or the like. The outer periphery 20 of the rolling diaphragm 15 is clamped between the casing part 11 and a separating wall 21 and forms a seal therewith.

The separating wall 21 has its inner annular periphery in sliding fit relation with the cylindrical member 18. A suitable annular seal 22 is provided between the periphery and the cylindrical member 18 to prevent air pressure or vacuum from passing between the periphery and the cylindrical member 18. The separating wall 21 cooperates with the rolling diaphragm 15 and the first movable wall 14 to form a second chamber 23.

A second movable wall 24 is disposed within the casing 10 and cooperates with a second rolling diaphragm 25, a cylindrical portion 26 of the separating wall 21, and the cylindrical member 18 to form a third chamber 27 neighboring to the chamber 23. The second rolling diaphragm 25 has its inner annular bead periphery 28 suited to a corresponding annular groove in a flange 29 of a tubular member 30 which is described hereinbelow and forms a seal therewith. The outer bead periphery 31 of the second rolling diaphragm 25 is clamped between the casing part 12 and the cylindrical portion 26 of the separating wall 21 and also forms a seal therewith. The second rolling diaphragm 25 cooperates with the casing part 12 to form a fourth chamber 32. It will be seen that the inner bead periphery 28 of the second rolling diaphragm 25 has a suitable number of projections 33 at regular intervals to provide stopper means for the second movable wall 24 as will be described in greater hereinbelow as the discussion proceeds. The second movable wall 24 has at its inner periphery a clamping element 34 fastened thereto by means of, such as, for example, welding. The clamping element 34 has a finger 35 in order to clamp the flange 29 of the cylindrical or tubular member 30 so that the second movable wall 24 can be joined together with flange 29 and hence the cylindrical member 30.

The tubular member 30 is slidable through a central bore 37 of the casing part 12 and is preferably sealed in its sliding relation to the casing part 12 as at 38. The tubular member 30 carries a cage 41 within which is free to slide a valve member 42 having an annular seat 43. The cage member 41 further carries therein a compressive member 44, such as rubber, and axially movable head 45 which is connected to a power transmitting rod 46 to be connected in turn to a brake master piston (not shown). The tubular member 30 has a concentric annular seal 47 surrounding the other annular seat 43 and engageable with a common valve element 48, valve element 48 being of bellows form and urged normally against the air valve seat 43 and toward abutment against the outer seat 47 by a compression spring 49.

The tubular member 30 has another port 50 which communicates the fourth chamber 32 with an annular chamber 51 defined around the valve member 42 and adjacent the seat 43. The annular chamber 51 is normally in communication with the chamber 27 through the unseated valve element 48 and the port 39. The valve element 48 is normally urged to a shoulder 52 of the tubular member 30 by a compression spring 53 which is anchored at one end thereof to a retainer 54 and hence by a shoulder 55 of a connecting rod 56 connecting to a brake pedal (not shown). The tubular member 30 further carries therein an air permeable cleaner member 57 and is covered by a boots 58 a right end wall of which has a port 59 for passage of air therethrough. Adjacent the port 59 is a cushioning member 60 which is in turn covered by a cap 61.

The first chamber 16 of the casing 10 communicates through a port 62 with a vehicle engine intake manifold (not shown). The first chamber 16 is further in communication with the third chamber 27 through a port 63 of the cylindrical portion 18 of the first movable wall 14. A large restoring spring 64 is contained in compressed position in the chamber 16 for normally urging the first movable wall 14 and hence the second movable wall 24 to the internal face of the casing part 12 with the projections 33 of the rolling diaphragm 25 abutting against the casing part 12 as shown. The third chamber 27 is, in the retracted position of the power assist mechanism shown, in fluid communication with the fourth chamber 32 through port 39, disengaging seat 47 and valve element 48, annular chamber 51 and port 50. The chamber 32 communicates with the second chamber 23 through a path 66 and a port 68.

From the foregoing it will be seen that the power assist is therefore of the character known as a vacuum suspended unit, vacuum being on both sides of each of the power walls or movable walls 14 and 24 when the power assist unit is in the retracted position shown.

A brake feel reaction system by which the invention is principally characterized is provided between the valve member 42 and the cage member 41 as hereinbelow described in detail.

The cage 41 is threaded in its external face as at 70 and internally threaded adjusting ring 71 engages the thread 70. The adjusting ring also serves as a spring retainer member for anchoring one end of the compression spring 64. When the power assist unit is installed, a clearance A is maintained between the left end face of the valve member 42 and the compressive member 44 by regulating the adjusting ring 71. Calculation of the clearance A is dependent upon an effort to attain to an earlier braking effect and hence to a necessary minimum braking distance of the vehicle as described hereinafter in detail. It should be noted that the transmitting rod 56 is normally spring urged to the right by the small compressed spring 53. This spring bias is transmitted to the valve member 42 and is restrained by an known arrangement formed of a key 72 and an annular groove 73 in the external face of the valve member 42 with which the key engages. The groove 73 is sized sufficiently to allow the valve member 42 to abut against and compress the compressive member 44 when in operation the member 42 is moved to the left. It should be also noted that a slight clearance marked B must be maintained when installation of the power assist unit is completed between the cage 41 and the flange 29 of the tubular member 30 as will be understood from the following description of operation.

OPERATION

The parts are shown in their normal or retracted positions, the valve element 48 engaging the seat 43 and being disengaged from the other seat 47. The chamber 32 is accordingly disconnected from atmosphere and communicates through port 50, annular chamber 51, disengaging seat 47 and valve element 48, and port 39 with the chamber 27 which in turn communicates through the port 63 with the first chamber 16 normally in communication with the engine intake manifold through the port 62. Since the chamber 23 is normally in communication with the chamber 32 through port 68 and path 66, all the chambers 16, 27, 32 and 23 are held open to vacuum so that no pressure differential exists across both power walls 14 and 24 with the power unit held in the retracted position shown.

The power assist unit is operated by depressing the brake pedal (not shown) to move the rod 56 to the left, thus imparting movement in the same direction to the valve member 42. This action takes place solely against the small spring 53 of a slight negligible bias and the valve seat 43 remains in engagement with such valve element 48 due to the biasing action of spring 49. This movement continues until the valve element 48 engages the seat 47 at which point the valve element will be in lap position. Further movement of the rod 56 will move the valve seat 43 away from the valve element 48. Under such condition, the chamber 32 and hence chamber 23 will be disconnected from the chamber 27 and hence the vacuum source and opened to the atmosphere.

The power walls 14 and 24 will move as a unit to the left in the view due to pressure differential thereacross. Force is delivered from the first power wall 14 through the cylindrical portion 18 and radially inwardly flanged portion 36 thereof to the ring 71 and hence cage 41. Another force is delivered at the same time from the second power wall 24 through the flange 29 and flanged portion 36 to the ring 71. Any opposition due to the brake reaction force is not presented against such movement until the valve member 42 abuts against the compressive member 44. The period between the initial movement of the rod 56 and the engagement of the valve member 42 with the compressive member 44 constitutes the first stage of non-reaction against movement of the brake pedal. A combined force of the first and second power walls 14 and 24 is transmitted through the compressive member 44 to the head 45 and hence to the rod 46 to thereby drive the non-illustrated master piston of the brake master cylinder for effecting braking force.

After the first stage, the compressive member 44 operates against the valve member 42 so as to effect brake feel back through the rod 56 in a manner well known in the art. Such reaction force will always be proportional to the resultant braking fluid pressure in the brake master cylinder.

When the pedal is released, reversal takes place, to again vacuum-suspend the unit.

During the above first stage, movement of the rod 56 is not opposed by the compressive member 44. Earlier braking effect is thus obtained due to the prompt movement of the rod 56 and hence the valve member 42 without being opposed by an appreciable force with the result that necessary minimum vehicle braking distance is accordingly attained.

In installation, having been regulated by rotation of the threaded ring 71, the clearance A can be permanently held in such regulated position by collapsing remaining or disengagingly revealed threads 70 on the cage 41.

While the embodiment of the present invention as herein disclosed constitutes preferred form, it is to be understood that other form, such as the known air suspend type, might be adopted.

What is claimed as new and desired to be secured by Letters Patent of the United States is:

1. A brake booster mechanism comprising a casing, at least one pressure reponsive power wall in said casing, valve mechanism means associated with said power wall and being movable relative thereto to control the differential pressure across the said power wall, actuating means connecting to a pedal for manually moving said valve mechanism means, output means for connecting the said power wall to a brake master piston, brake feel reaction means having a compressive member interposed between the said actuating means and the output means with a play clearance with respect to the actuating means in the retracted position thereof, and adjusting thread means for regulating said play clearance whereby during initial stage movement said actuating means is opposed by no brake reaction force through said compressive member until the actuating means becomes in abutment against the compressive member past the play clearance, and wherein said brake feel reaction means comprises a cage member, a head member connecting to said output means and slidably received in the cage member to define a chamber therein, said compressive member being held captive in the chamber, said actuating means being movable relative to and having an acting face exposed against a portion of the compressive member with said clearance maintained therebetween, said cage member being axially threaded on the external face thereof, said adjusting thread means being an internally threaded ring in engagement with the threaded cage while being normally spring-biased toward abutment engagement with said power wall.

2. A mechanism according to claim 1 wherein the power assist brake booster mechanism is provided with a restoring compressed spring in the casing normally urging the power wall toward the rest position and said internally threaded ring anchors one end of the restoring spring.

3. A mechanism according to claim 1 wherein the mechanism is of a type in which vacuum is normally on both sides of the power wall in the retracted position of the mechanism.

4. A mechanism according to claim 1 wherein the valve mechanism is contained within said power wall and has air passage means extending through the valve mechanism.

* * * * *